US012100254B2

(12) United States Patent
Takabatake

(10) Patent No.: US 12,100,254 B2
(45) Date of Patent: Sep. 24, 2024

(54) GATE APPARATUS, METHOD FOR CONTROLLING GATE APPARATUS, AND PROGRAM

(71) Applicant: NEC Corporation, Tokyo (JP)

(72) Inventor: Maya Takabatake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 444 days.

(21) Appl. No.: 17/434,056

(22) PCT Filed: Feb. 27, 2020

(86) PCT No.: PCT/JP2020/007971
§ 371 (c)(1),
(2) Date: Aug. 26, 2021

(87) PCT Pub. No.: WO2020/175611
PCT Pub. Date: Sep. 3, 2020

(65) Prior Publication Data

US 2022/0139142 A1 May 5, 2022

(30) Foreign Application Priority Data

Feb. 28, 2019 (JP) ................................ 2019-035356

(51) Int. Cl.
*G07C 9/10* (2020.01)
*G07C 9/00* (2020.01)
*G07C 9/32* (2020.01)

(52) U.S. Cl.
CPC ........... *G07C 9/32* (2020.01); *G07C 9/00563* (2013.01); *G07C 9/00944* (2013.01); *G07C 9/10* (2020.01)

(58) Field of Classification Search
CPC .. G07C 1/00; G07C 2209/64; G07C 9/00563; G07C 9/10; G07C 9/30; G07C 9/32;
(Continued)

(56) References Cited

U.S. PATENT DOCUMENTS

2005/0092831 A1* 5/2005 Sandoval ............... G07B 15/04 235/382
2018/0182213 A1 6/2018 Osumi et al.
(Continued)

FOREIGN PATENT DOCUMENTS

CN 200965698 Y 10/2007
CN 107464116 A 12/2017
(Continued)

OTHER PUBLICATIONS

International Search Report for PCT Application No. PCT/JP2020/007971, mailed on May 26, 2020.
(Continued)

*Primary Examiner* — Dionne Pendleton
(74) *Attorney, Agent, or Firm* — Sughrue Mion, PLLC

(57) ABSTRACT

A gate apparatus (10) includes a first light emission unit (110), a first person detection unit (120), a second person detection unit (122), and a control unit (140). Each of the first person detection unit (120) and the second person detection unit (122) detects existence of a person. The second person detection unit (122) is positioned on the exit side of the first person detection unit (120). Then, the control unit (140) changes the light emission state of the first light emission unit (110) from a first state to a second state different from the first state with detection of a person by the first person detection unit (120) as at least one condition. Further, the control unit (140) sets the light emission state of the first light emission unit (110) to the first state with detection of a person by the second person detection unit (122) as at least one condition.

13 Claims, 15 Drawing Sheets

(58) Field of Classification Search
CPC ... G07C 9/27; G07C 9/37; G07C 9/15; G07C 9/00944; G07C 9/20; G07C 9/253; G07C 2209/08; G07C 2209/63; G07C 9/00; G07C 9/257; G07C 9/28; G07C 9/38; G07G 1/00; G07G 1/01; H04W 4/021; H04W 4/029; H04W 84/18; H04N 23/51; H04N 23/54; H04N 23/55; H04N 23/56; H04N 7/183; H04N 7/188; G08B 13/08; G08B 23/00; G07B 15/04; G06V 20/52; G06V 2201/05; G06V 40/00; G06V 40/16; G06V 40/172; G06T 1/00; G01S 13/887; G06K 19/06028; E06B 11/022; E06B 11/085; A01K 1/0017; A01K 11/006; E05G 5/003; E05F 15/73; E05F 15/78; E05F 15/79
See application file for complete search history.

(56) References Cited

U.S. PATENT DOCUMENTS

| | | | |
|---|---|---|---|
| 2019/0019191 | A1 | 1/2019 | Jung et al. |
| 2019/0279446 | A1 | 9/2019 | Kunieda et al. |

FOREIGN PATENT DOCUMENTS

| | | | |
|---|---|---|---|
| CN | 107730245 | A | 2/2018 |
| CN | 107844969 | A | 3/2018 |
| CN | 107924656 | A | 4/2018 |
| CN | 207718457 | U | 8/2018 |
| CN | 208014032 | U | 10/2018 |
| CN | 208421251 | U | 1/2019 |
| CN | 109389404 | A | 2/2019 |
| JP | 2005-316787 | A | 11/2005 |
| JP | 2006-202342 | A | 8/2006 |
| JP | 2006-227883 | A | 8/2006 |
| JP | 2017-090880 | A | 5/2017 |
| JP | 2017-162012 | A | 9/2017 |
| JP | 2018-022320 | A | 2/2018 |
| JP | 2019-021283 | A | 2/2019 |
| WO | 2018/016022 | A1 | 1/2018 |
| WO | 2018/061813 | A1 | 4/2018 |

OTHER PUBLICATIONS

Chinese Office Action for CN Application No. 202080016821.8, mailed on Aug. 30, 2022 with English Translation.

* cited by examiner

S304

S308

GATE APPARATUS, METHOD FOR CONTROLLING GATE APPARATUS, AND PROGRAM

This application is a National Stage Entry of PCT/JP2020/007971 filed on Feb. 27, 2020, which claims priority from Japanese Patent Application 2019-035356 filed on Feb. 28, 2019, the contents of all of which are incorporated herein by reference, in their entirety.

TECHNICAL FIELD

The present invention relates to a gate apparatus, a method for controlling a gate apparatus, and a program.

BACKGROUND ART

A gate apparatus may be provided at an entrance and/or an exit of a predetermined space such as a building or a store. A mechanism for making a notification to a passerby is often provided in a gate apparatus. PTL 1 describes providing an entrance-side display and an exit-side display on a gate apparatus and making a predetermined notification to a passerby. Further, PTL 2 describes providing a notification light on a gate apparatus and notifying a passerby of no passing by using the notification light.

PTL 3 describes making a predetermined notification to a passerby by displaying an image such as a three-dimensional image. Further, PTL 4 describes providing a display unit on a gate apparatus for an elevator and displaying an elevator number assigned to a passerby on the display unit.

CITATION LIST

Patent Literature

PTL 1: Japanese Patent Application Publication No. 2006-202342

PTL 2: Japanese Patent Application Publication No. 2006-227883

PTL 3: Japanese Patent Application Publication No. 2017-090880

PTL 4: International Application Publication No. WO 2018/016022

SUMMARY OF INVENTION

Technical Problem

When a plurality of persons successively pass through a gate apparatus, it may be preferable that a next person do not enter the gate apparatus while a previous person is passing through the gate apparatus. In such a case, the next person needs to be notified of a timing for entering the gate apparatus.

An object of the present invention is, when a plurality of persons successively pass through a gate apparatus, notifying a next person of a timing for entering the gate apparatus after a previous person enters the gate apparatus.

Solution to Problem

The present invention provides a gate apparatus provided on a passage through which a person passes, the gate apparatus including:

a first light emission unit;

a first person detection unit;

a second person detection unit positioned on an exit side of the first person detection unit; and a control unit that controls the first light emission unit by using a detection result of the first person detection unit and a detection result of the second person detection unit, wherein the control unit changes a light emission state of the first light emission unit from a first state to a second state with detection of a person by the first person detection unit as at least one condition, and changes a light emission state of the first light emission unit from the second state to the first state with detection of a person by the second person detection unit as at least one condition.

The present invention provides a method for controlling, by the computer, a gate apparatus being provided on a passage through which a person passes and including a first light emission unit, a first person detection unit, and a second person detection unit positioned on an exit side of the first person detection unit, the method including:

changing a light emission state of the first light emission unit from a first state to a second state with detection of a person by the first person detection unit as at least one condition; and changing a light emission state of the first light emission unit from the second state to the first state with detection of a person by the second person detection unit as at least one condition.

The present invention provides a program for causing a computer to function as a control unit that controls a gate apparatus being provided on a passage through which a person passes and including a first light emission unit, a first person detection unit, and a second person detection unit positioned on an exit side of the first person detection unit, the program causing the computer to have:

a function of changing a light emission state of the first light emission unit from a first state to a second state with detection of a person by the first person detection unit as at least one condition; and a function of changing a light emission state of the first light emission unit from the second state to the first state with detection of a person by the second person detection unit as at least one condition.

Advantageous Effects of Invention

The present invention enables, when a plurality of persons successively pass through a gate apparatus, notification of a timing for entering the gate apparatus to a next person after a previous person enters the gate apparatus.

BRIEF DESCRIPTION OF DRAWINGS

The aforementioned object, other objects, features and advantages will become more apparent by the following preferred example embodiments and accompanying drawings.

Figure 5A:
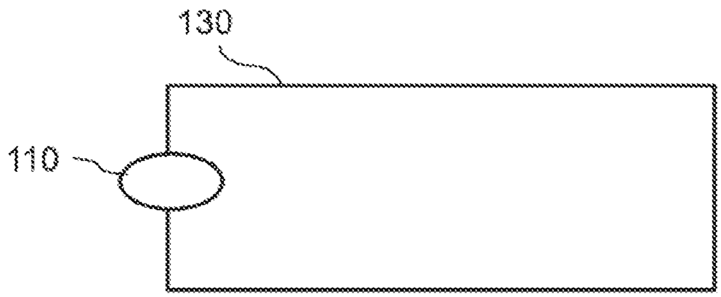
Figure 5B:
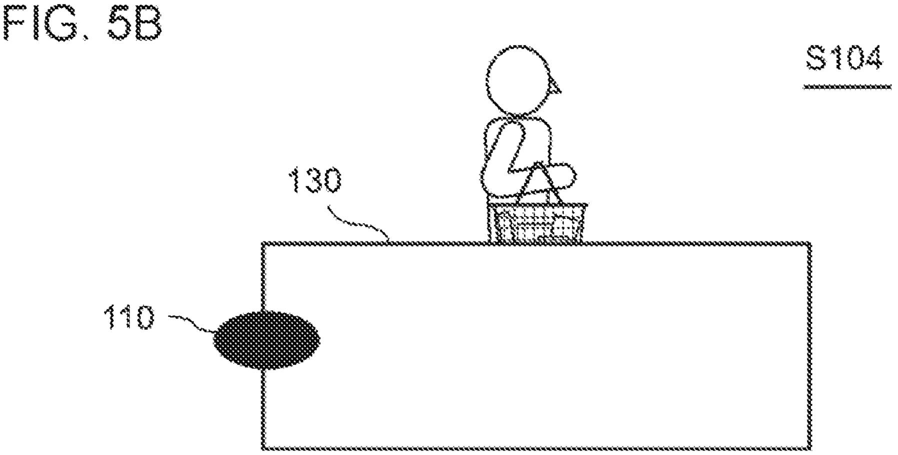
Figure 5C:
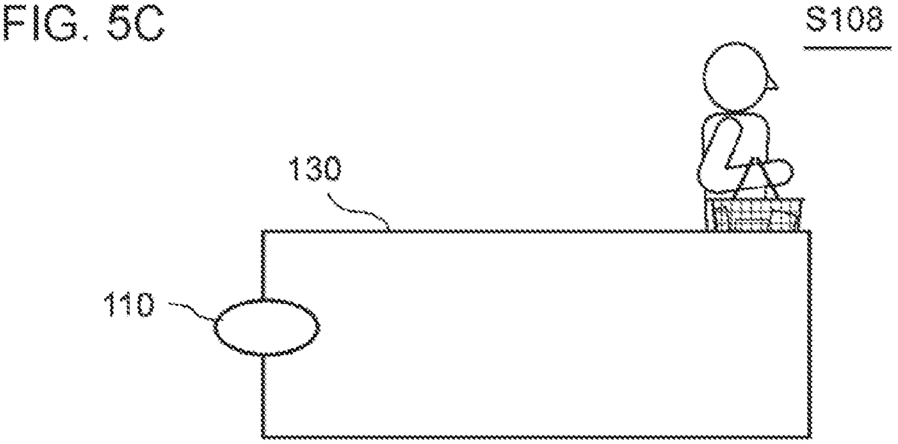

Each of sections (A), (B), and (C) in FIG. 5 is a diagram for illustrating a light emission state of a first light emission unit.

Figure 6:
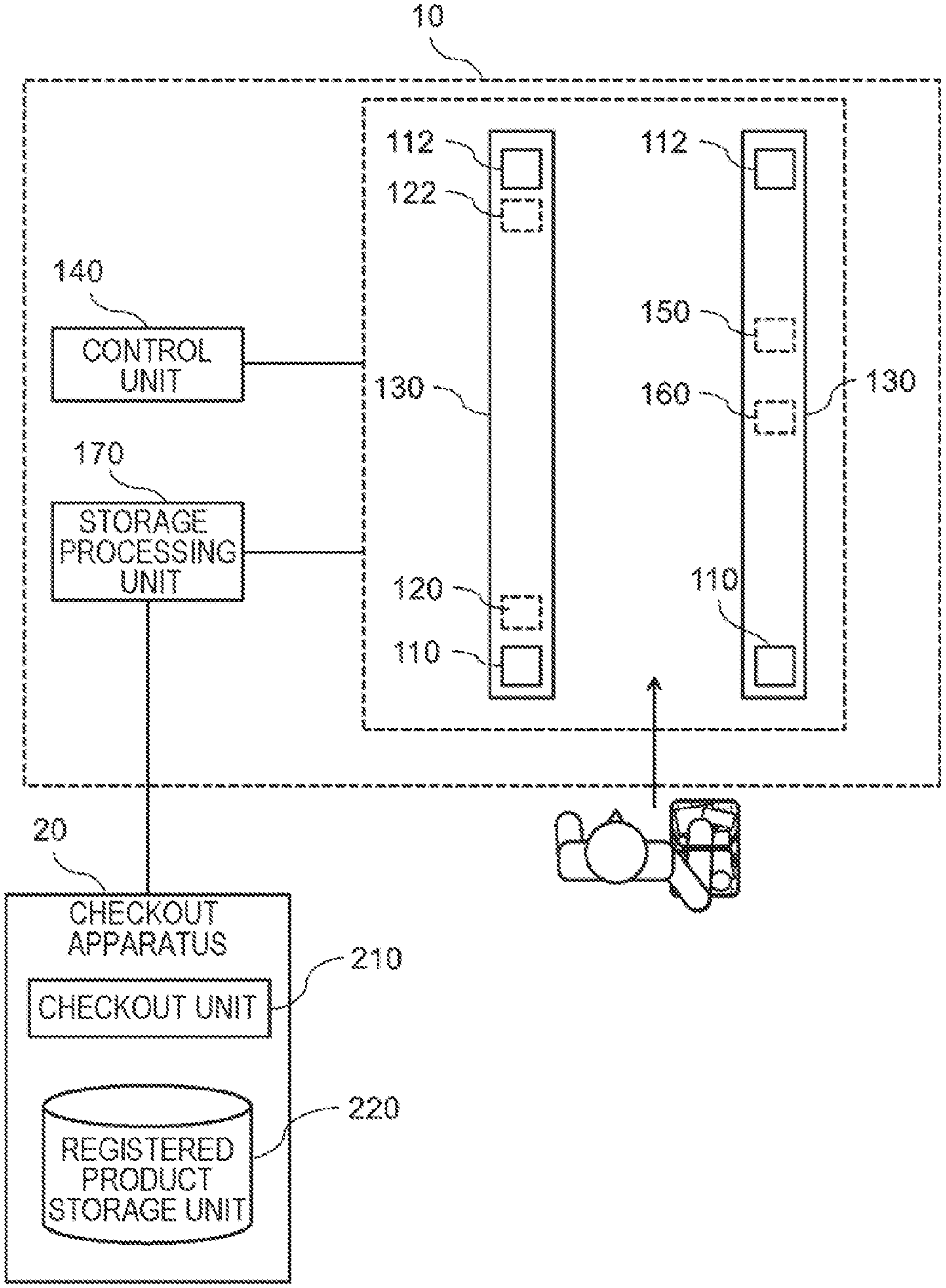

FIG. 6 is a diagram illustrating a functional configuration of a gate apparatus according to a second example embodiment.

Figure 7:
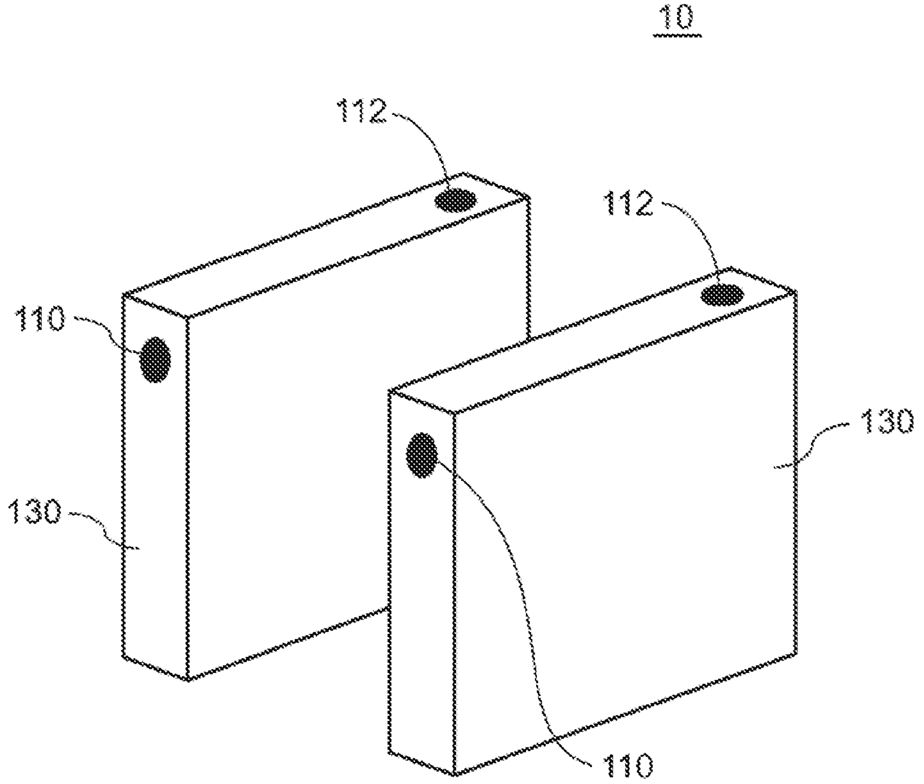

FIG. 7 is a perspective view of an enclosure according to the second example embodiment.

Figure 8:
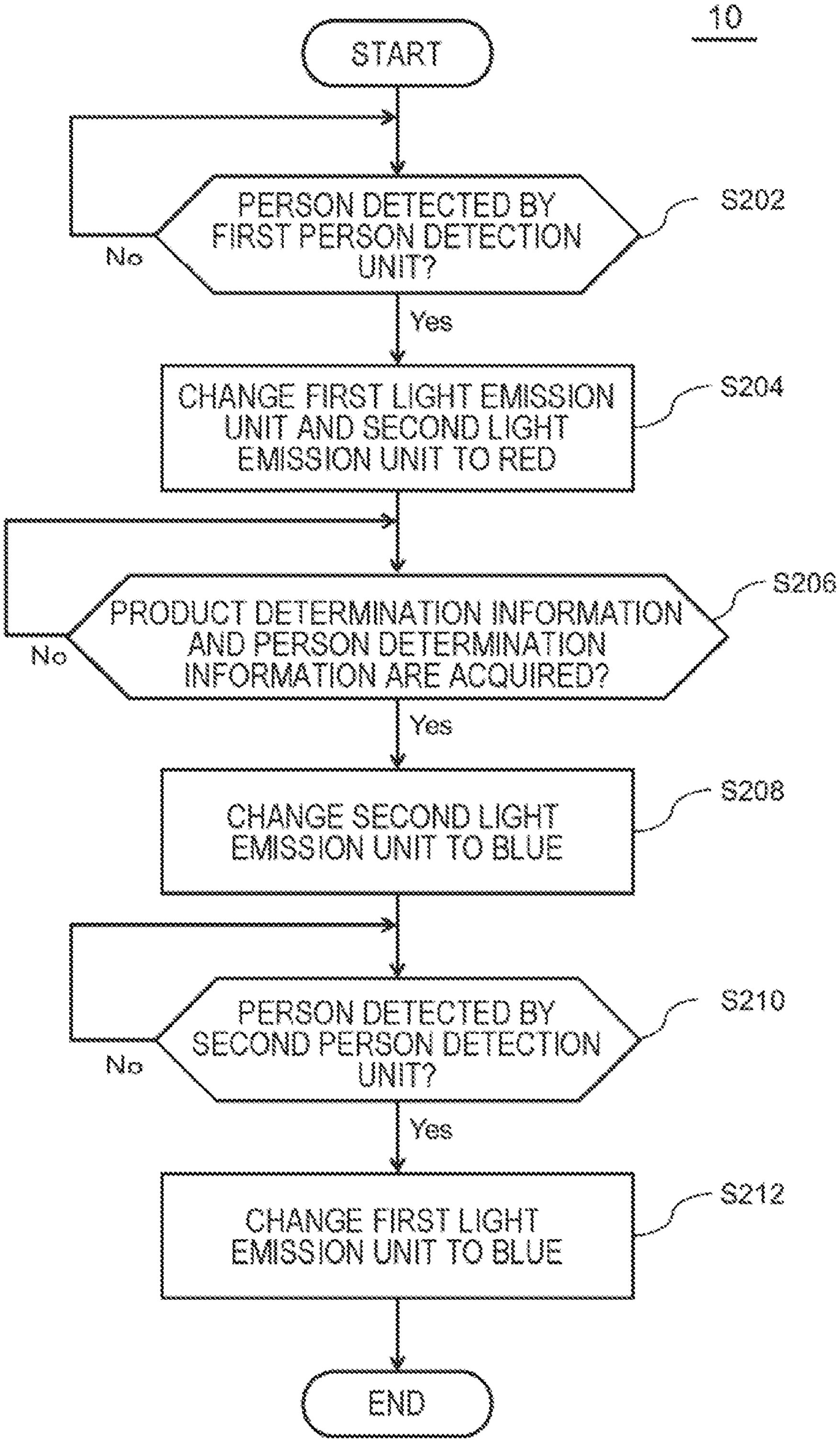

FIG. 8 is a flowchart for illustrating a first operation example of the gate apparatus according to the second example embodiment.

Figure 9A:
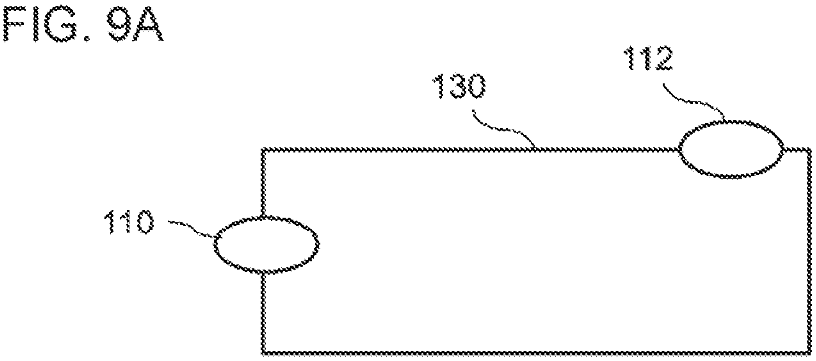
Figure 9B:
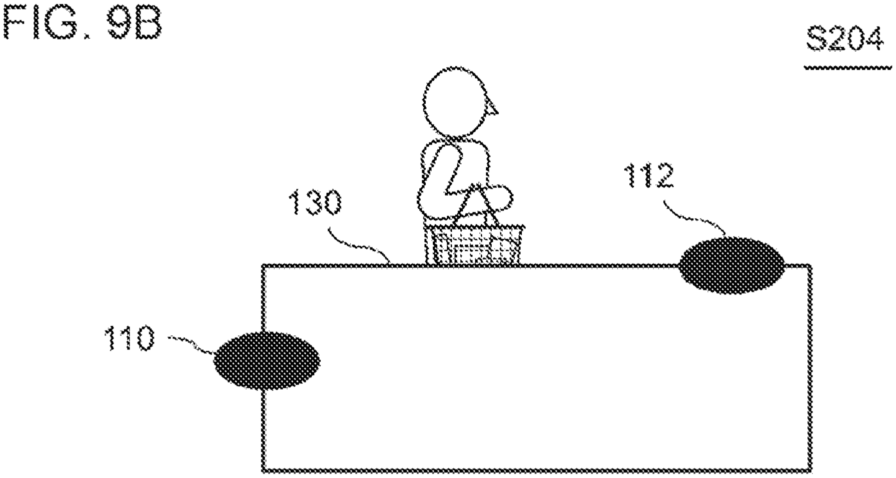

Each of sections (A) and (B) in FIG. 9 is a diagram for illustrating light emission states of a first light emission unit and a second light emission unit.

Figure 10A:
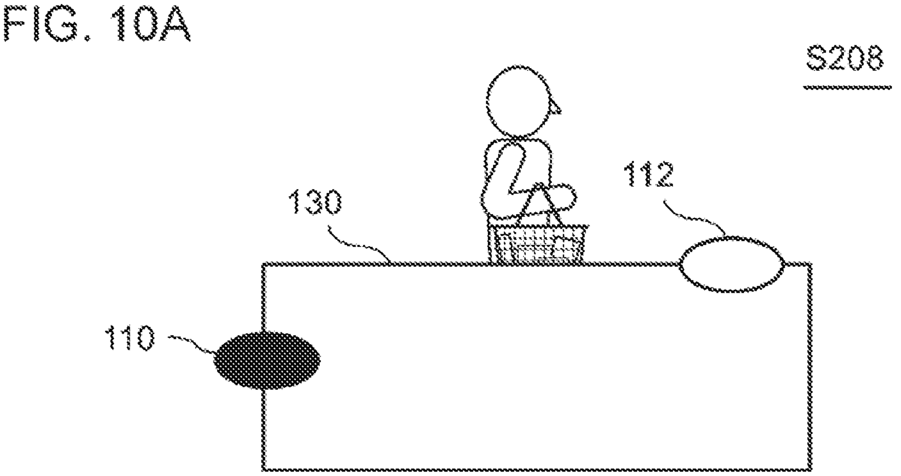
Figure 10B:
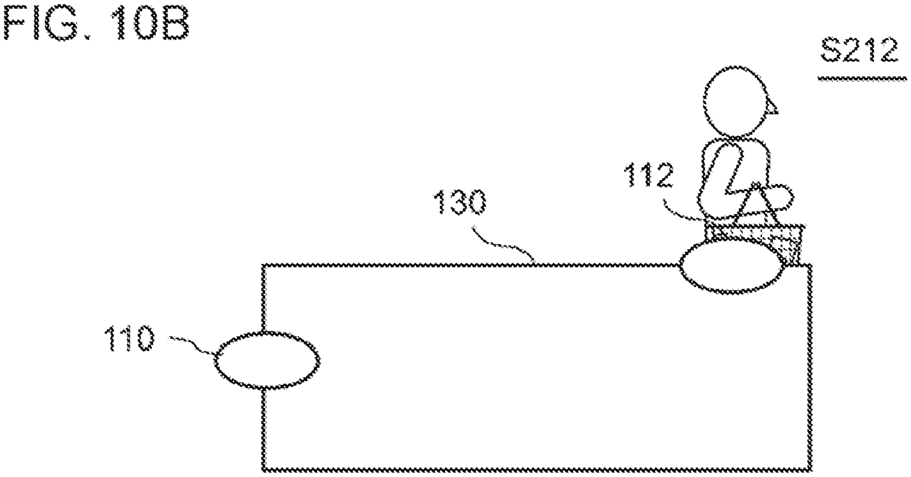

Each of sections (A) and (B) in FIG. 10 is a diagram for illustrating light emission states of the first light emission unit and second light emission unit.

Figure 11:
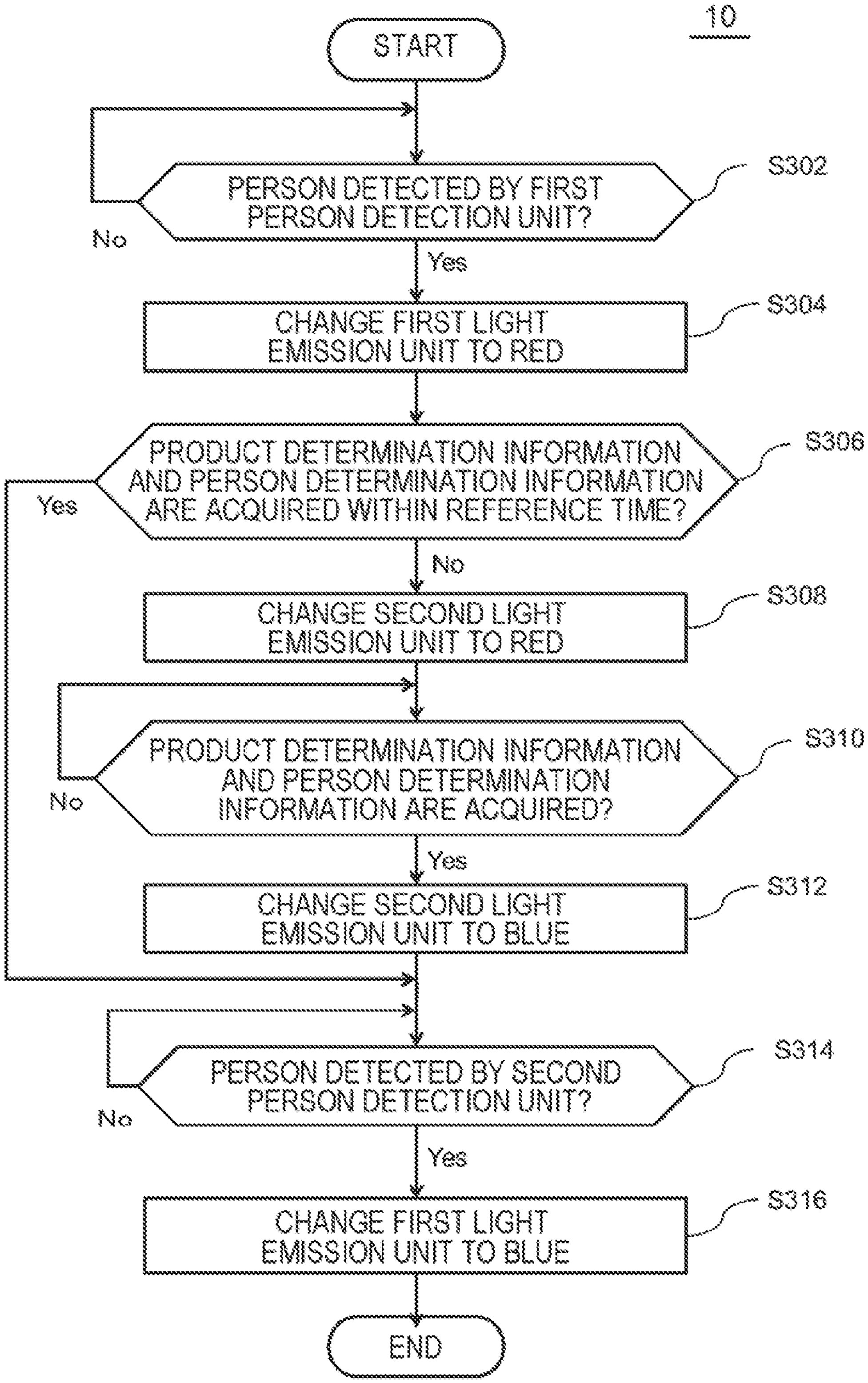

FIG. 11 is a flowchart for illustrating a second operation example of the gate apparatus according to the second example embodiment.

Figure 12A:
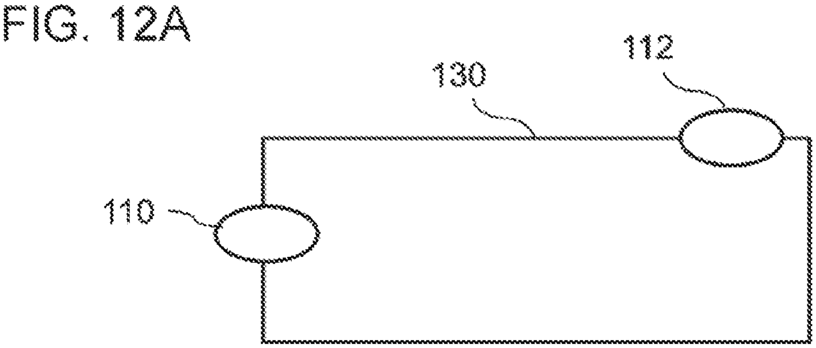
Figure 12B:
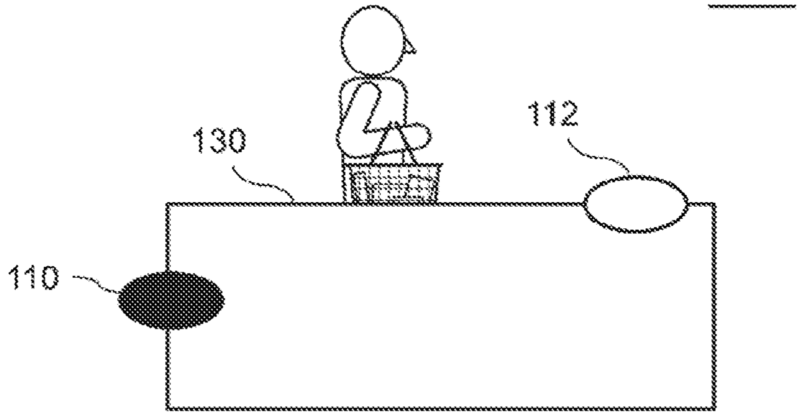
Figure 12C:
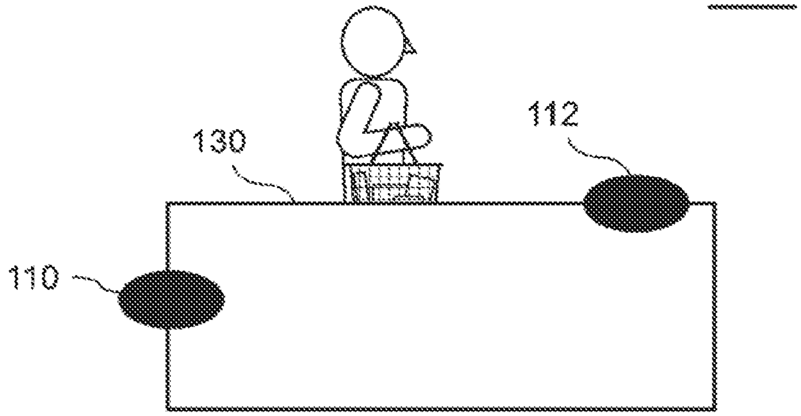

Each of sections (A), (B), and (C) in FIG. 12 is a diagram for illustrating light emission states of the first light emission unit and the second light emission unit.

Figure 13A:
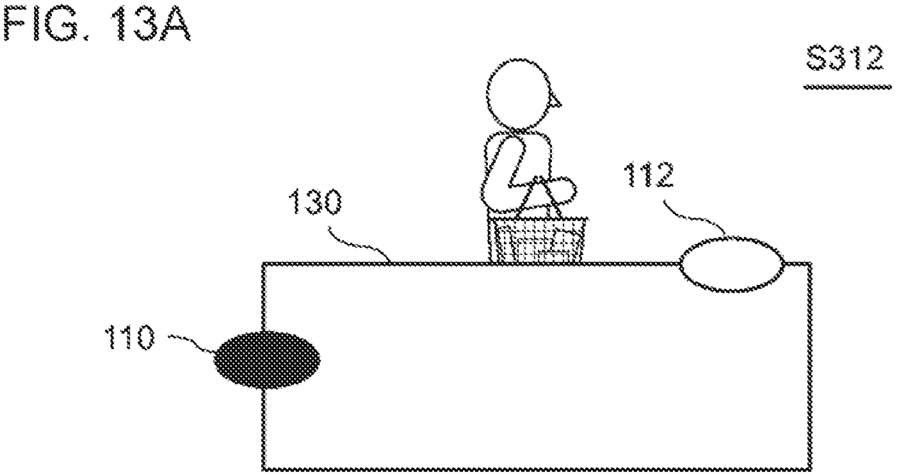
Figure 13B:
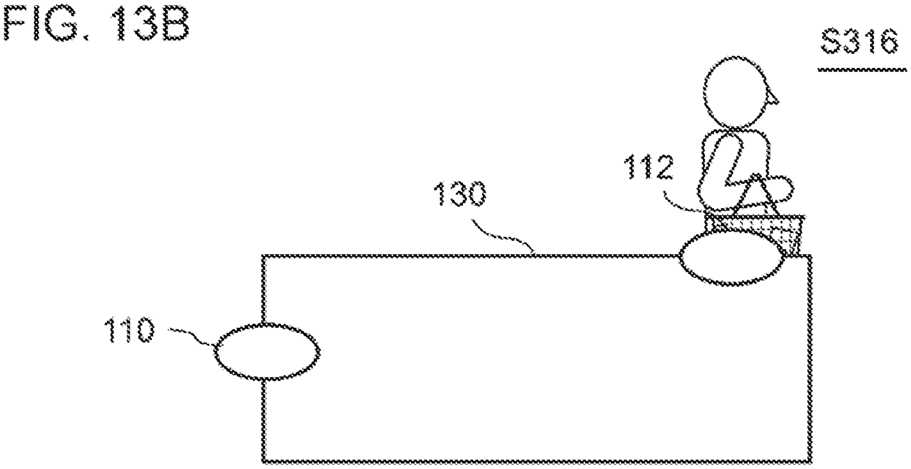

Each of sections (A) and (B) in FIG. 13 is a diagram for illustrating light emission states of the first light emission unit and the second light emission unit.

Figure 14:
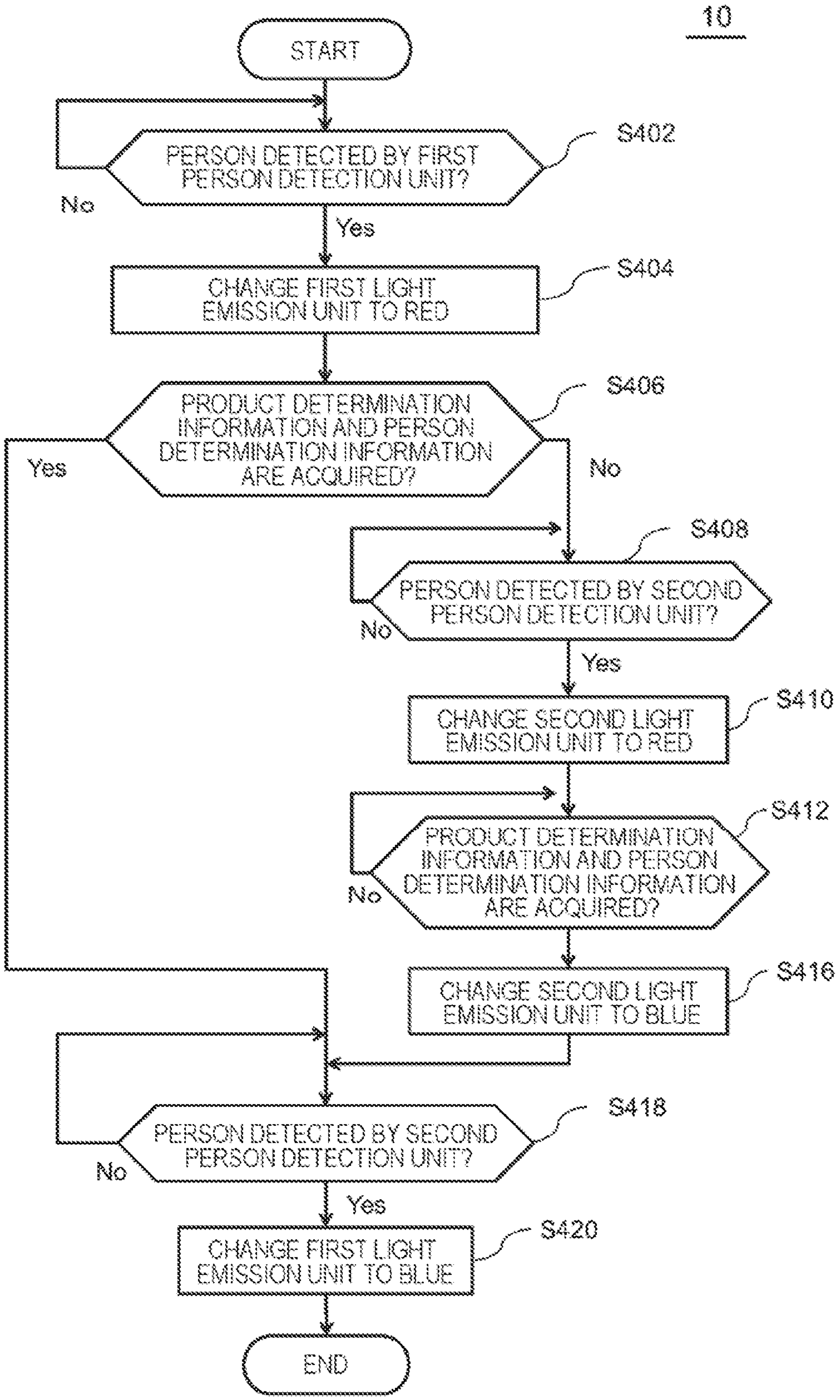

FIG. 14 is a flowchart for illustrating a third operation example of the gate apparatus according to the second example embodiment.

Figure 15:
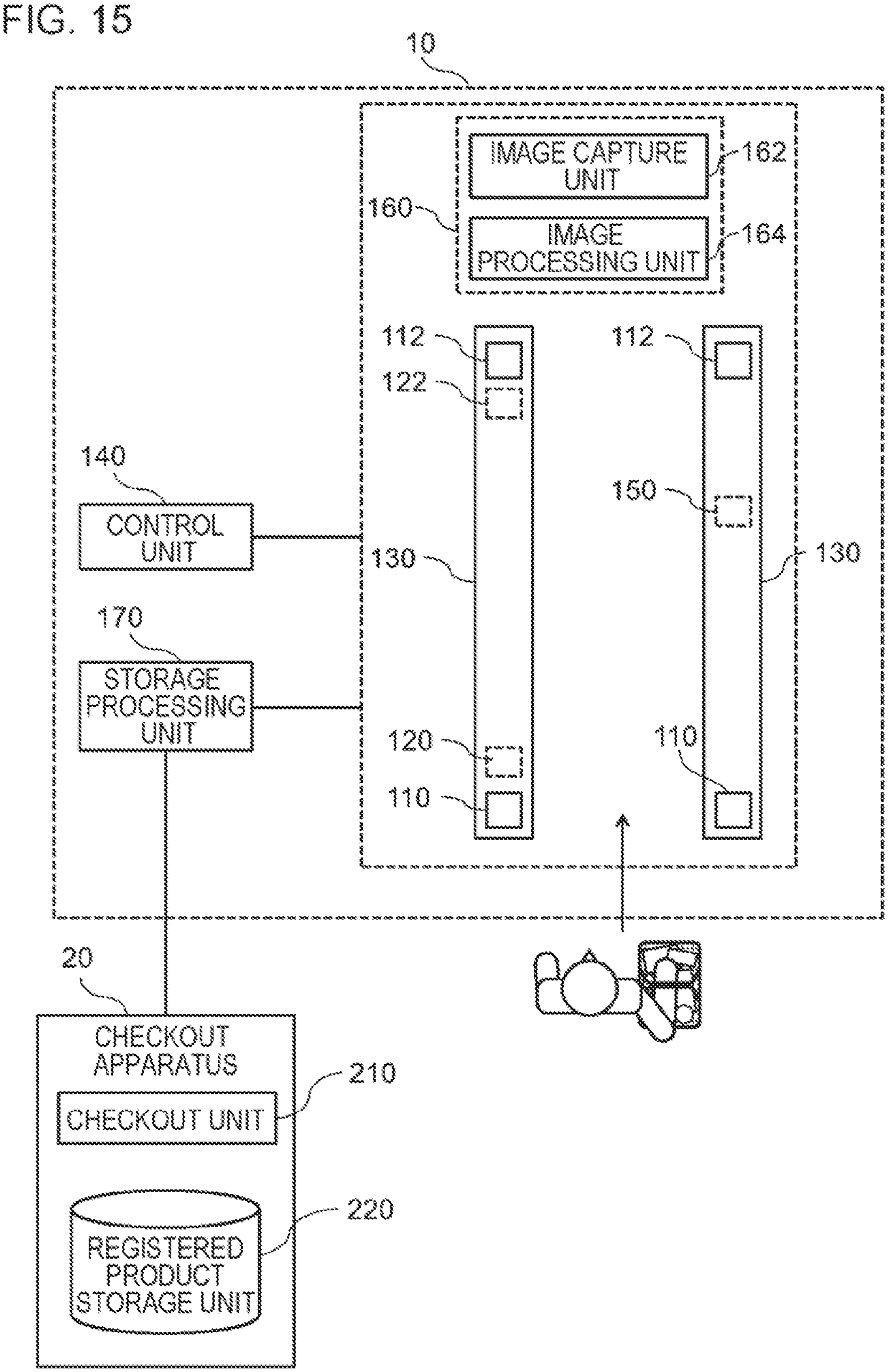

FIG. 15 is a diagram illustrating a functional configuration of a gate apparatus according to a third example embodiment.

EXAMPLE EMBODIMENT

Example embodiments of the present invention will be described below by using drawings. Note that in every drawing, similar components are given similar signs, and description thereof is omitted as appropriate.

First Example Embodiment

Functional Configuration Example

Figure 1:
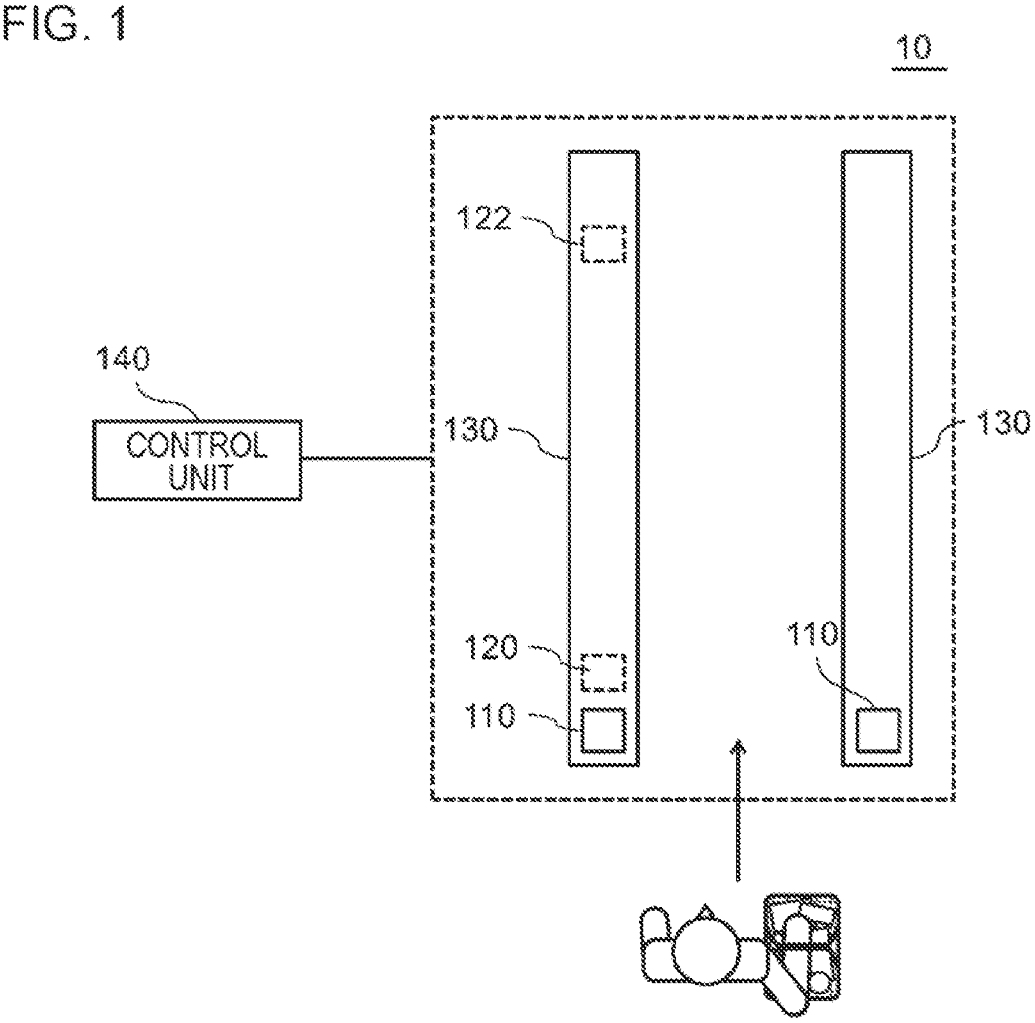
FIG. 1 is a diagram illustrating a functional configuration of a gate apparatus according to a first example embodiment.

FIG. 1 is a diagram illustrating a functional configuration of a gate apparatus 10 according to the present example embodiment. The gate apparatus 10 is provided on a passage through which a person passes. For example, the passage is an entrance or an exit to a predetermined area. For example, the predetermined area may be a store, a building, a specific room or a floor in a building, or an elevator hall.

The gate apparatus 10 includes a first light emission unit 110, a first person detection unit 120, a second person detection unit 122, and a control unit 140. The first light emission unit 110 is provided for notifying a person entering the gate apparatus 10 of whether the person may enter the gate apparatus 10. The first light emission unit 110 is provided on the entrance side of the gate apparatus 10. Consequently, a passerby can check the first light emission unit 110 before entering the gate apparatus 10. Each of the first person detection unit 120 and the second person detection unit 122 detects existence of a person. The second person detection unit 122 is positioned on the exit side of the first person detection unit 120. Then, the control unit 140 controls the light emission state of the first light emission unit 110 by using a detection result of the first person detection unit 120 and a detection result of the second person detection unit 122. For example, the control unit 140 changes the light emission state of the first light emission unit 110 from a first state to a second state different from the first state with detection of a person by the first person detection unit 120 as at least one condition. For example, the first state indicates that entry to the gate is granted, and the second state indicates that entry to the gate is denied. Further, the control unit 140 sets the light emission state of the first light emission unit 110 to the first state with detection of a person by the second person detection unit 122 as at least one condition.

For example, the first light emission unit 110 includes a light-emitting device such as an LED and can emit light in at least each of the aforementioned first state and second state. For example, the difference between the first state and the second state may be a difference in color of emitted light or may be a difference in a light emission pattern. For example, the first state is blue, and the second state is red. Further, the first state may be lighting, and the second state may be blinking. Further, the first state may be no lighting, and the second state may be lighting or blinking.

Further, another notification unit may be used in place of the first light emission unit 110. In this case, for example, the notification unit is a display. In this case, the difference between the first state and the second state may be a difference in a displayed content in addition to the aforementioned examples. Further, the notification unit may make notification by voice output.

The following description assumes that the first state of the first light emission unit 110 is blue and the second state is red.

The first person detection unit 120 includes a sensor detecting approach of a person. For example, the sensor may be an infrared sensor or a sensor detecting a person by image processing.

Further, the sensor included in the first person detection unit 120 may include a light emission unit and a light reception unit. In this case, the light emission unit and the light reception unit are provided at positions facing each other with a passage for persons in between. Then, when the light reception unit does not receive light emitted by the light emission unit, in other words, when a person is positioned between the light emission unit and the light reception unit, the first person detection unit 120 outputs a signal indicating detection of a person to the control unit 140.

The gate apparatus 10 includes a plurality of enclosures 130. The enclosures 130 are installed on both sides of the passage for persons, respectively. Then, each of the two enclosures 130 includes the first light emission unit 110. Further, at least one enclosure 130 includes the first person detection unit 120 and the second person detection unit 122. However, the first light emission unit 110 may be provided on only one enclosure 130. In this case, the first light emission unit 110 and the first person detection unit 120 may be provided on the same enclosure 130, or at least one of the units may be provided on a different enclosure 130.

In the example illustrated in FIG. 1, the first light emission unit 110, the first person detection unit 120, and the second person detection unit 122 are provided in this order counting from the entrance side of the gate apparatus 10. However, the first light emission unit 110 and the first person detection unit 120 may be provided at almost the same position, or the position of the first person detection unit 120 may be closer to the entrance of the gate apparatus 10 than the position of the first light emission unit 110.

Hardware Configuration Example

Figure 2:
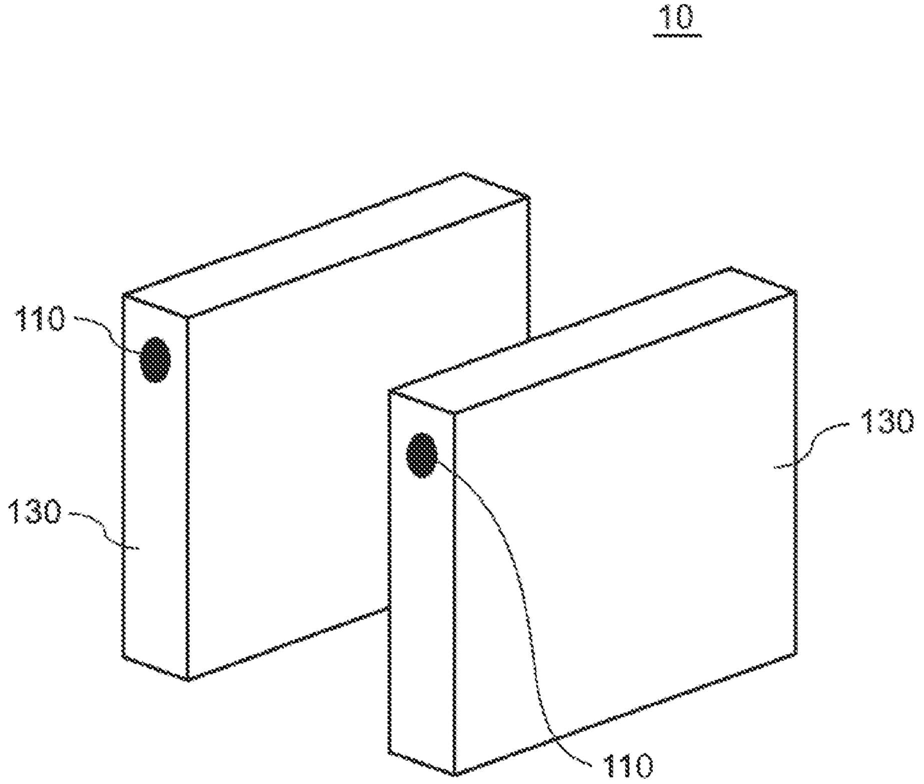
FIG. 2 is an example of a perspective view of an enclosure.

FIG. 2 is an example of a perspective view of the enclosure 130. In the example illustrated in the diagram, the first light emission unit 110 is provided on the front of the enclosure 130, in other words, in an area facing the entrance side out of sides of the enclosure 130, when the enclosure 130 is viewed from the entrance side. Thus, a passerby can readily check the light emission state of the first light emission unit 110 before entering the gate apparatus 10. Note that a recessed part may be provided on the front of the enclosure 130, and the first light emission unit 110 may be provided at the bottom of the recessed part. Such a configuration can make it difficult for a person not in front of the gate apparatus 10, that is, a person who does not intend to enter the gate apparatus 10 to see the first light emission unit 110.

Figure 3:
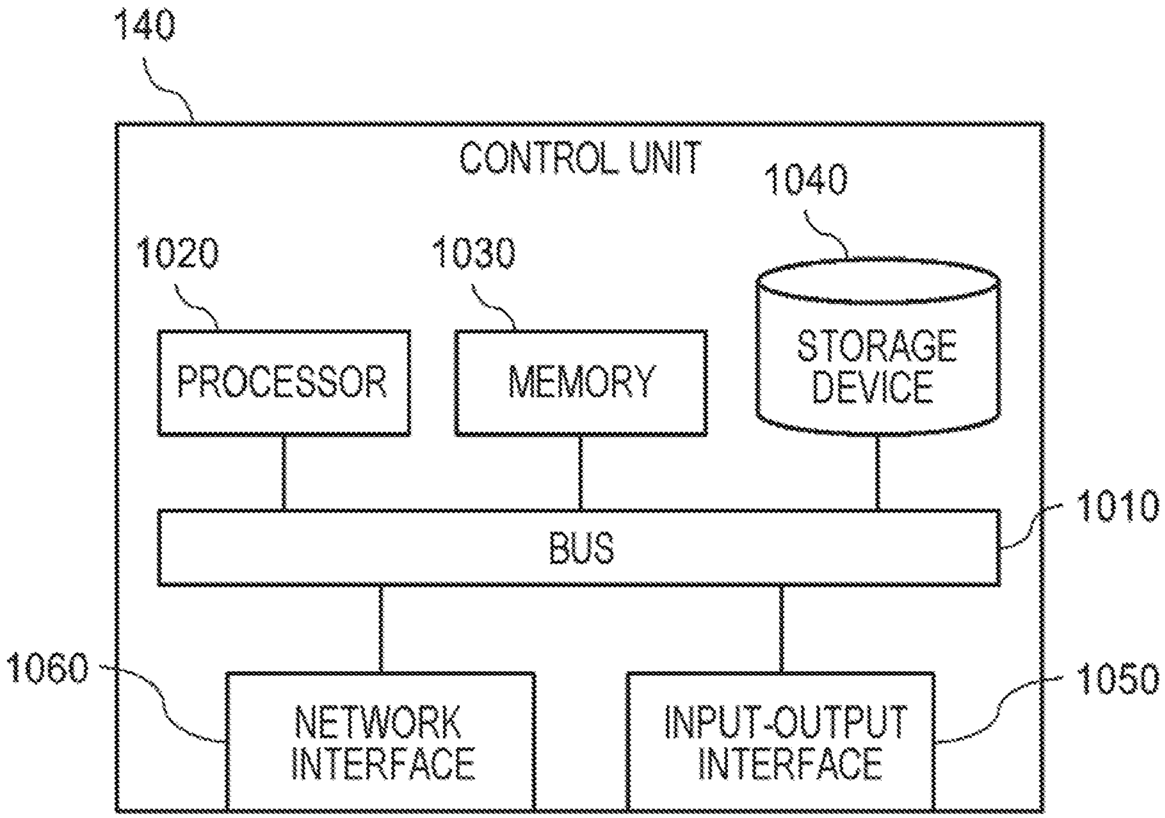
FIG. 3 is a block diagram illustrating a hardware configuration of a control unit.

FIG. 3 is a block diagram illustrating a hardware configuration of the control unit 140 illustrated in FIG. 1. The control unit 140 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from one another. Note that the method of interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores a program module providing each function of the control unit 140. By the processor 1020 reading each program module into the memory 1030 and executing the program module, each function related to the program module is provided.

The input-output interface 1050 is an interface for connecting the control unit 140 to various types of input-output equipment.

The network interface 1060 is an interface for connecting the control unit 140 to a network. For example, the network is a local area network (LAN) or a wide area network (WAN). The method of connecting the network interface 1060 to the network may be a wireless connection or a wired connection.

Then, the control unit 140 is connected to required equipment (such as the first light emission unit 110, the first person detection unit 120, and the second person detection unit 122) through the input-output interface 1050 or the network interface 1060.

Operation Example

Figure 4:
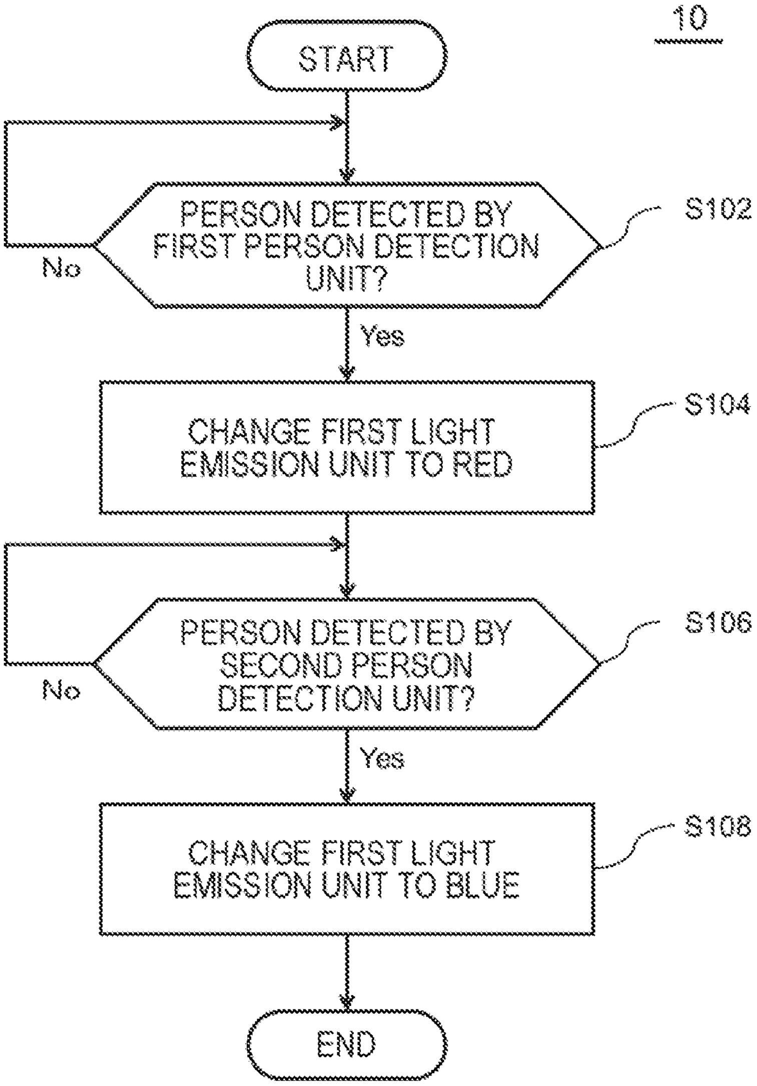
FIG. 4 is a flowchart for illustrating an operation example of the gate apparatus.

FIG. 4 is a flowchart for illustrating an operation example of the gate apparatus 10. FIG. 5 is a diagram for illustrating light emission states of the first light emission unit 110. Before a person enters the gate apparatus 10, the control unit 140 causes the first light emission unit 110 to emit light in blue (that is, the first state) [a section (A) in FIG. 5]. When a person enters the gate apparatus 10, the first person detection unit 120 in the gate apparatus 10 outputs a signal indicating detection of a person to the control unit 140 (Step S102 in FIG. 4: Yes). Then, the control unit 140 changes the color of emitted light of the first light emission unit 110 to red (that is, the second state) [Step S104 in FIG. 4 and a section (B) in FIG. 5]. Consequently, a next person recognizes that the next person cannot enter the gate apparatus 10.

When the person in the gate apparatus 10 subsequently advances and approaches the exit, the second person detection unit 122 detects the person and outputs a signal indicating detection of a person to the control unit 140 (Step S106 in FIG. 4: Yes). Then, the control unit 140 returns the color of emitted light of the first light emission unit 110 to blue (that is, the first state) [Step S108 in FIG. 4 and a section (C) in FIG. 5]. Consequently, the next person recognizes that the next person may enter the gate apparatus 10.

As described above, when the first person detection unit 120 detects a person, the control unit 140 changes the color of emitted light of the first light emission unit 110 from blue (that is, the first state) to red (that is, the second state), according to the present example embodiment. Consequently, a next person can recognize that the next person cannot enter the gate apparatus 10. When the second person detection unit 122 subsequently detects the person, the control unit 140 returns the color of emitted light of the first light emission unit 110 to blue. Consequently, the next person can recognize that the next person may enter the gate apparatus 10.

Second Example Embodiment

Functional Configuration Example

FIG. 6 is a diagram illustrating a functional configuration of a gate apparatus 10 according to the present example embodiment. The gate apparatus 10 according to the present example embodiment is installed in order to perform checkout processing at a store. Then, the gate apparatus 10 acquires person determination information of a person passing through a gate and product determination information of a product held by the person. The gate apparatus 10 has a configuration similar to that of the gate apparatus 10 according to the first example embodiment except for the following points.

First, the gate apparatus 10 includes a second light emission unit 112. The second light emission unit 112 is provided for notifying a person exiting the gate apparatus 10 of whether the person may exit the gate apparatus 10. The second light emission unit 112 is positioned on the exit side of a first light emission unit 110 in the gate apparatus 10 and the light emission state thereof is controlled by a control unit 140. The second light emission unit 112 can emit light in a third state and a fourth state different from the third state. For example, the third state indicates that entry to the gate is granted, and the fourth state indicates that entry to the gate is denied. Examples of the difference between the third state and the fourth state are similar to the examples of the difference between the first state and the second state described in the first example embodiment. Note that the third state and the fourth state of the second light emission unit 112 may be the same as the first state and the second state of the first light emission unit 110 or may be different. The following description assumes that the third state is blue, and the fourth state is red.

Note that another notification unit may be used in place of the second light emission unit 112. In this case, for example, the notification unit is a display. In this case, the difference between the third state and the fourth state may be a difference in a displayed content in addition to the aforementioned examples. Further, the notification unit may make notification by voice output.

In the example illustrated in the diagram, the first light emission unit 110, the first person detection unit 120, the second person detection unit 122, and the second light emission unit 112 are provided in this order counting from the entrance side of the gate apparatus 10. However, the first light emission unit 110 and the first person detection unit 120 may be provided at almost the same position, or the position of the first person detection unit 120 may be closer to the entrance of the gate apparatus 10 than the position of the first light emission unit 110, similarly to the first example embodiment. Further, the second light emission unit 112 and the second person detection unit 122 may be provided at almost the same position.

Further, the gate apparatus 10 includes a product determination information acquisition unit 150 and a person determination information acquisition unit 160.

The product determination information acquisition unit 150 acquires product determination information of a product passing through the gate apparatus 10. The product determination information is information for determining the product in the store and, for example, is an ID assigned to the product in the store.

For example, the product determination information acquisition unit 150 may include a reader reading code information [for example, a two-dimensional code such as a QR code (registered trademark) or a bar code] provided on a product. In this case, for example, a person passing through the gate apparatus 10 may cause the reader to read a product code. Further, when an IC tag is attached to a product and the IC tag stores product determination information, the product determination information acquisition unit 150 may read the product determination information from the IC tag. In this case, a read area of an IC tag by the product determination information acquisition unit 150 includes at least part of an area of the gate apparatus 10 between the first person detection unit 120 and the second person detection unit 122.

The person determination information acquisition unit 160 acquires person determination information of a person passing through the gate apparatus 10. For example, the person determination information acquisition unit 160 reads person determination information from a storage medium, a communication terminal such as a smartphone, or a membership card held by a person passing through the gate apparatus 10. The person determination information is information for distinguishing the person from another person and, for example, may be an ID assigned to the person or may be a feature value generated from an image of the person (such as a feature value of the face). For example, the person determination information acquisition unit 160 is positioned between the first person detection unit 120 and the second person detection unit 122 in a traveling direction of a person, that is, a direction along a passage.

Then, the control unit 140 sets the light emission state of the second light emission unit 112 to blue with acquisition of person determination information by the person determination information acquisition unit 160 and acquisition of product determination information by the product determination information acquisition unit 150 as at least one condition.

Further, the gate apparatus 10 includes a storage processing unit 170. The storage processing unit 170 associates, with each other, product determination information acquired by the product determination information acquisition unit 150 and person determination information acquired by the person determination information acquisition unit 160 and causes a registered product storage unit 220 to store the pieces of information for checkout processing.

The storage processing unit 170 may associate product determination information with person determination information before a target person exits the gate apparatus 10 (in other words, before the second person detection unit 122 detects the person). In this case, the storage processing unit 170 associates, with each other, product determination information and person determination information acquired between detection of the person by the first person detection unit 120 and detection of the person by the second person detection unit 122. At this time, a plurality of pieces of product determination information may be associated with one piece of person determination information.

Further, the storage processing unit 170 may associate product determination information with person determination information after a target person exits the gate apparatus 10 (in other words, after the second person detection unit 122 detects the person). In this case, along with information acquired by the product determination information acquisition unit 150 and the person determination information acquisition unit 160, the storage processing unit 170 also acquires acquisition times of the information from the units. Then, the storage processing unit 170 associates, with each other, product determination information and person determination information the acquisition times of which satisfy a criterion. For example, after acquiring person determination information, the storage processing unit 170 associates the person determination information with product determination information acquired between a time point before the acquisition time of the person determination information by a reference time and a time point after the acquisition time by the reference time.

In the example illustrated in the diagram, the registered product storage unit 220 is part of a checkout apparatus 20. The checkout apparatus 20 includes a checkout unit 210. The checkout unit 210 performs checkout processing by using information stored by the registered product storage unit 220.

For example, person determination information is previously associated with a payment method (such as a credit card number, a bank account number, and a prepaid type electronic money number). A storage apparatus storing the association may reside inside the checkout apparatus 20 or outside the checkout apparatus 20. Then, the checkout unit 210 reads a combination of product determination information and person determination information from the registered product storage unit 220. The checkout unit 210 acquires the price of a product indicated by the read product determination information by using a product database. Further, the checkout unit 210 determines a payment method related to the read person determination information by using the aforementioned storage apparatus. Then, the checkout unit 210 performs settlement processing of the acquired price by using the payment method.

After settlement processing is performed, the checkout unit 210 transmits an electronic receipt to a customer terminal. An electronic receipt generally includes at least data printed on a paper receipt. Transmission of the electronic receipt may be performed through an apparatus managing electronic receipts.

Hardware Configuration

FIG. 7 is a perspective view of an enclosure 130 according to the present example embodiment. In an example illustrated in the diagram, a second light emission unit 112 is provided on the top of the enclosure 130. Consequently, a person halfway through passing through the gate apparatus 10 can readily check the light emission state of the second light emission unit 112.

First Operation Example

FIG. 8 is a flowchart for illustrating a first operation example of the gate apparatus 10 according to the present example embodiment. FIG. 9 and FIG. 10 are diagrams for illustrating light emission states of the first light emission unit 110 and the second light emission unit 112.

Before a person enters the gate apparatus 10, the control unit 140 causes the first light emission unit 110 to emit light in blue (that is, the first state) and causes the second light emission unit 112 to emit light also in blue (that is, the third state) [a section (A) in FIG. 9]. Then, a person purchasing a product in the store enters the gate apparatus 10 in a state of holding the product. Note that the product may be put in a cart or a product basket of the store or may be put in a product basket or a bag owned by the person.

When a person enters the gate apparatus 10, the first person detection unit 120 in the gate apparatus 10 outputs a signal indicating detection of a person to the control unit 140 (Step S202 in FIG. 8: Yes). Then, the control unit 140 changes the color of emitted light of the first light emission unit 110 to red (that is, the second state) and changes the color of emitted light of the second light emission unit 112 to red (that is, the fourth state) [Step S204 in FIG. 8 and a section (B) in FIG. 9]. Consequently, a next person recognizes that the next person cannot enter the gate apparatus 10. Further, the person in the gate apparatus 10 recognizes that the gate apparatus 10 has not acquired product determination information and person determination information and payment cannot be made.

Next, after the product determination information acquisition unit 150 acquires product determination information and the person determination information acquisition unit 160 acquires person determination information (Step S206 in FIG. 8: Yes), the control unit 140 in the gate apparatus 10 changes the light emission state of the second light emission unit 112 to blue (that is, the third state) [Step S208 in FIG. 8 and a section (A) in FIG. 10]. Consequently, the person in the gate apparatus 10 recognizes that the gate apparatus 10 has acquired product determination information and person determination information and the person may exit the gate apparatus 10.

As the person subsequently advances through the gate apparatus 10, the second person detection unit 122 outputs a signal indicating detection of the person to the control unit 140 (Step S210 in FIG. 8: Yes). Then, the control unit 140 returns the color of emitted light of the first light emission unit 110 to blue (that is, the first state) [Step S212 in FIG. 8 and a section (B) in FIG. 10]. Consequently, the next person recognizes that the previous person has exited the gate apparatus 10 and the next person may enter the gate apparatus 10.

The condition for returning the color of emitted light of the first light emission unit 110 to blue in the flowchart includes completion of both acquisition of person determination information and acquisition of product determination information.

Second Operation Example

FIG. 11 is a flowchart for illustrating a second operation example of the gate apparatus 10 according to the present example embodiment. FIG. 12 and FIG. 13 are diagrams for illustrating light emission states of the first light emission unit 110 and the second light emission unit 112.

Before a person enters the gate apparatus 10, the control unit 140 causes the first light emission unit 110 to emit light in blue (that is, the first state) and causes the second light emission unit 112 to emit light also in blue (that is, the third state) [a section (A) in FIG. 12], similarly to the first operation example. Then, a person purchasing a product in the store enters the gate apparatus 10 in a state of holding the product, similarly to the first operation example.

When a person enters the gate apparatus 10, the first person detection unit 120 in the gate apparatus 10 outputs a signal indicating detection of a person to the control unit 140 (Step S302 in FIG. 11: Yes). Then, the control unit 140 changes the color of emitted light of the first light emission unit 110 to red (that is, the second state) [Step S304 in FIG. 11 and a section (B) in FIG. 12]. Consequently, a next person recognizes that the next person cannot enter the gate apparatus 10. However, the color of emitted light of the second light emission unit 112 is maintained blue (that is, the third state).

Then, when at least either of acquisition of the person determination information and acquisition of the product determination information is not completed within a reference time after the first person detection unit 120 detects the person (Step S306 in FIG. 11: No), the control unit 140 changes the color of emitted light of the second light emission unit 112 to red (that is, the fourth state) [Step S308 in FIG. 11 and a section (C) in FIG. 12]. Consequently, the person in the gate apparatus 10 recognizes that at least either of product determination information and person determination information is not acquired by the gate apparatus 10 and payment cannot be made.

The control unit 140 may further change the light emission state of the second light emission unit 112 according to the type of information that cannot be read. For example, the control unit 140 may make the light emission state in a case of only product determination information being unable to be read, the light emission state in a case of only person determination information being unable to be read, and the light emission state in a case of both product determination information and person determination information being unable to be read different from one another.

The person in the gate apparatus 10 subsequently causes the gate apparatus 10 to be able to read the information that cannot be read. Then, when the gate apparatus 10 reads the information (Step S310 in FIG. 11: Yes), the control unit 140 changes the light emission state of the second light emission unit 112 to blue (that is, the third state) [Step S312 in FIG. 11 and a section (A) in FIG. 13]. Consequently, the person in the gate apparatus 10 recognizes that the gate apparatus 10 has acquired product determination information and person determination information and the person may exit the gate apparatus 10.

As the person subsequently advances through the gate apparatus 10, the second person detection unit 122 outputs a signal indicating detection of the person to the control unit 140 (Step S314 in FIG. 11: Yes). Then, the control unit 140 returns the color of emitted light of the first light emission unit 110 to blue (that is, the first state) [Step S316 in FIG. 11 and a section (B) in FIG. 13]. Consequently, the next person recognizes that the previous person has exited the gate apparatus 10 and the next person may enter the gate apparatus 10.

Third Operation Example

FIG. 14 is a flowchart for illustrating a third operation example of the gate apparatus 10 according to the present example embodiment. FIG. 12 and FIG. 13 may be referred to as needed below.

Before a person enters the gate apparatus 10, the control unit 140 causes the first light emission unit 110 to emit light in blue (that is, the first state) and causes the second light emission unit 112 to emit light in blue (that is, the third state), similarly to the second operation example [the section (A) in FIG. 12]. Then a person purchasing a product in the store enters the gate apparatus 10 in a state of holding the product, similarly to the second operation example.

When a person enters the gate apparatus 10, the first person detection unit 120 in the gate apparatus 10 outputs a signal indicating detection of a person to the control unit 140 (Step S402 in FIG. 14: Yes). Then, the control unit 140 changes the color of emitted light of the first light emission unit 110 to red (that is, the second state) [Step S304 in FIG. 14 and the section (B) in FIG. 12]. Consequently, a next person recognizes that the next person cannot enter the gate apparatus 10. However, the color of emitted light of the second light emission unit 112 is maintained blue (that is, the third state).

Then, when the second person detection unit 122 detects the person (Step S408 in FIG. 14: Yes) before both person determination information and product determination information are acquired (Step S406: No), the control unit 140 changes the second light emission unit 112 to red (that is, the fourth state) [Step S410 in FIG. 14 and the section (C) in FIG. 12]. Consequently, the person in the gate apparatus 10 recognizes that at least either of product determination information and person determination information is not acquired by the gate apparatus 10 and payment cannot be made.

The control unit 140 may further change the light emission state of the second light emission unit 112 according to the type of information that cannot be read, similarly to second operation example.

The person in the gate apparatus 10 subsequently causes the gate apparatus 10 to be able to read the information that cannot be read. Then, when the gate apparatus 10 reads the information (Step S412 in FIG. 14: Yes), the control unit 140 changes the light emission state of the second light emission unit 112 to blue (that is, the third state) [Step S416 in FIG. 14 and the section (A) in FIG. 13]. Consequently, the person in the gate apparatus 10 recognizes that the gate apparatus 10 has acquired product determination information and person determination information and the person may exit the gate apparatus 10.

As the person advances through the gate apparatus 10 after Step S416 in FIG. 14 and when acquisition of product determination information and person determination information is completed before the second person detection unit 122 detects the person (Step S406 in FIG. 14: Yes), the second person detection unit 122 outputs a signal indicating detection of the person to the control unit 140 (Step S418 in FIG. 14: Yes). Then, the control unit 140 returns the color of emitted light of the first light emission unit 110 to blue (that is, the first state) [Step S420 in FIG. 14 and the section (B) in FIG. 13]. Consequently, the next person recognizes that the previous person has exited the gate apparatus 10 and the next person may enter the gate apparatus 10.

As described above, when a person passes through the gate apparatus 10, product determination information of a product held by the person is associated with person determination information of the person, according to the present example embodiment. At this time, when the person is exiting the gate apparatus 10 before the information is acquired, the control unit 140 in the gate apparatus 10 changes a display of the second light emission unit 112 to red. Consequently, the person exiting the gate apparatus 10 before acquisition of product determination information and person determination information can be restrained. Accordingly, product determination information and person determination information can be acquired with a high probability.

Third Example Embodiment

FIG. 15 is a diagram illustrating a functional configuration of a gate apparatus 10 according to a third example embodiment. The gate apparatus 10 according to the present example embodiment is similar to the gate apparatus 10 according to the second example embodiment except for a configuration of a person determination information acquisition unit 160.

The person determination information acquisition unit 160 according to the present example embodiment acquires person determination information by image processing. As an example, the person determination information acquisition unit 160 includes an image capture unit 162 and an image processing unit 164. An image capture range of the image capture unit 162 includes an area of a passage overlapping the gate apparatus 10. Consequently, an image generated by the image capture unit 162 includes a person entering the gate apparatus 10. The image processing unit 164 acquires person determination information by processing an image generated by the image capture unit 162.

For example, the person determination information acquisition unit 160 is connectable to a storage apparatus. The storage apparatus stores a feature value of the face of each of a plurality of persons in association with person determination information of the person. Then, the image processing unit 164 reads person determination information related to a feature value extracted from an image generated by the image capture unit 162 from the storage apparatus.

The present example embodiment also provides an effect similar to that of the second example embodiment. Further, a person passing through the gate apparatus 10 does not need to perform work for causing the gate apparatus 10 to read person determination information of the person. Consequently, a load on the person passing through the gate apparatus 10 is decreased.

While the example embodiments of the present invention have been described above with reference to the drawings, the drawings are exemplifications of the present invention, and various configurations other than those described above may be employed.

Further, while a plurality of processes (processing) are described in a sequential order in each of a plurality of flowcharts used in the aforementioned description, an execution order of processes executed in each example embodiment is not limited to the described order. An order of the illustrated processes may be modified without affecting the contents in each example embodiment. Further, the aforementioned example embodiments may be combined without contradicting one another.

The aforementioned example embodiments may also be described in part or in whole as the following supplementary notes but are not limited thereto.

1. A gate apparatus provided on a passage through which a person passes, the gate apparatus including:

a first light emission unit;

a first person detection unit;

a second person detection unit positioned on an exit side of the first person detection unit; and a control unit that controls the first light emission unit by using a detection result of the first person detection unit and a detection result of the second person detection unit, wherein the control unit changes a light emission state of the first light emission unit from a first state to a second state with detection of a person by the first person detection unit as at least one condition, and changes a light emission state of the first light emission unit from the second state to the first state with detection of a person by the second person detection unit as at least one condition.

2. The gate apparatus according to aforementioned 1, further including a second light emission unit being positioned on an exit side of the first light emission unit and being able to emit light in a third state and a fourth state, wherein the control unit controls a light emission state of the second light emission unit.

3. The gate apparatus according to aforementioned 2, further including:

a product determination information acquisition unit that acquires product determination information of a product passing through the gate apparatus; and a person determination information acquisition unit that acquires person determination information of a person passing through the gate apparatus, wherein the control unit sets a light emission state of the second light emission unit to the third state with acquisition of the person determination information by the person determination information acquisition unit and acquisition of the product determination information by the product determination information acquisition unit as at least one condition.

4. The gate apparatus according to aforementioned 3, wherein the control unit sets a light emission state of the second light emission unit to the fourth state when at least either of acquisition of the person determination information and acquisition of the product determination information is not completed within a reference time after the first person detection unit detects a person.

5. The gate apparatus according to aforementioned 3 or 4, wherein the control unit sets a light emission state of the second light emission unit to the fourth state when the second person detection unit detects a person before at least either of acquisition of the person determination information and acquisition of the product determination information is completed.

6. The gate apparatus according to aforementioned 3, wherein the control unit sets a light emission state of the second light emission unit to the fourth state when the first person detection unit detects a person and sets a light emission state of the second light emission unit to the third state when both acquisition of the person determination information and acquisition of the product determination information are subsequently completed.

7. The gate apparatus according to any one of aforementioned 3 to 6, wherein the control unit sets a light emission state of the first light emission unit to the first state with completion of both acquisition of the person determination information and acquisition of the product determination information after the first person detection unit detects a person and a light emission state of the first light emission unit is set to the second state as at least one condition.

8. The gate apparatus according to any one of aforementioned 3 to 7, wherein an IC tag storing the product determination information is attached to the product, and the product determination information acquisition unit acquires the product determination information from the IC tag.

9. The gate apparatus according to any one of aforementioned 3 to 8, wherein the person determination information acquisition unit acquires the person determination information by processing an image generated by an image capture unit an image capture range of which includes an area of the passage overlapping the gate apparatus.

10. The gate apparatus according to any one of aforementioned 3 to 9, wherein the person determination information acquisition unit acquires the person determination information from a storage medium or a communication terminal held by the person.

11. The gate apparatus according to any one of aforementioned 3 to 10, further including a storage processing unit causing a storage unit to store, for checkout processing, the person determination information acquired by the person determination information acquisition unit and the product determination information acquired by the product determination information acquisition unit in association with each other.

12. The gate apparatus according to any one of aforementioned 2 to 11, further including an enclosure provided on a side of the passage, wherein the second light emission unit is positioned on a top of the enclosure.

13. The gate apparatus according to any one of aforementioned 1 to 12, further including an enclosure provided on a side of the passage, wherein the first light emission unit is positioned at a front on an entrance side of the enclosure.

14. A method for controlling, by a computer, a gate apparatus being provided on a passage through which a person passes and including a first light emission unit, a first person detection unit, and a second person detection unit positioned on an exit side of the first person detection unit, the method including:

changing a light emission state of the first light emission unit from a first state to a second state with detection of a person by the first person detection unit as at least one condition; and changing a light emission state of the first light emission unit from the second state to the first state with detection of a person by the second person detection unit as at least one condition.

15. The method for controlling a gate apparatus according to aforementioned 14, wherein a second light emission unit is positioned on an exit side of the first light emission unit, the second light emission unit being able to emit light in a third state and a fourth state, and wherein the method further includes, by the computer, controlling a light emission state of the second light emission unit.

16. The method for controlling a gate apparatus according to aforementioned 15, further including, by the computer:

acquiring product determination information of a product passing through the gate apparatus;

acquiring person determination information of a person passing through the gate apparatus; and setting a light emission state of the second light emission unit to the third state with acquisition of the person determination information and acquisition of the product determination information as at least one condition.

17. The method for controlling a gate apparatus according to aforementioned 16, further including, by the computer, setting a light emission state of the second light emission unit to the fourth state when at least either of acquisition of the person determination information and acquisition of the product determination information is not completed within a reference time after the first person detection unit detects a person.

18. The method for controlling a gate apparatus according to aforementioned 16 or 17, further including, by the computer, setting a light emission state of the second light emission unit to the fourth state when the second person detection unit detects a person before at least either of acquisition of the person determination information and acquisition of the product determination information is completed.

19. The method for controlling a gate apparatus according to aforementioned 16, further including, by the computer:

setting a light emission state of the second light emission unit to the fourth state when the first person detection unit detects a person; and setting a light emission state of the second light emission unit to the third state when both acquisition of the person determination information and acquisition of the product determination information are subsequently completed.

20. The method for controlling a gate apparatus according to any one of aforementioned 16 to 19, further including, by the computer, setting a light emission state of the first light emission unit to the first state with completion of both acquisition of the person determination information and acquisition of the product determination information after the first person detection unit detects a person and a light emission state of the first light emission unit is set to the second state as at least one condition.

21. The method for controlling a gate apparatus according to any one of aforementioned 16 to 20, wherein an IC tag storing the product determination information is attached to the product, and the method further includes, by the computer, acquiring the product determination information stored in the IC tag.

22. The method for controlling a gate apparatus according to any one of aforementioned 16 to 21, further including, by the computer, acquiring the person determination information by processing an image generated by an image capture unit an image capture range of which includes an area of the passage overlapping the gate apparatus.

23. The method for controlling a gate apparatus according to any one of aforementioned 16 to 22, further including, by the computer, acquiring the person determination information from a storage medium or a communication terminal held by the person.

24. The method for controlling a gate apparatus according to any one of aforementioned 16 to 23, further including, by the computer, causing a storage unit to store, for checkout processing, the acquired person determination information and the acquired product determination information in association with each other.

25. A program for causing a computer to function as a control unit that controls a gate apparatus being provided on a passage through which a person passes and including a first light emission unit, a first person detection unit, and a second person detection unit positioned on an exit side of the first person detection unit, the program causing the computer to have:

a function of changing a light emission state of the first light emission unit from a first state to a second state with detection of a person by the first person detection unit as at least one condition; and a function of changing a light emission state of the first light emission unit from the second state to the first state with detection of a person by the second person detection unit as at least one condition.

26. The program according to aforementioned 25, wherein a second light emission unit is positioned on an exit side of the first light emission unit, the second light emission unit being able to emit light in a third state and a fourth state, and the program further causes the computer to have a function of controlling a light emission state of the second light emission unit.

27. The program according to aforementioned 26, further causing the computer to have:

a function of acquiring product determination information of a product passing through the gate apparatus;

a function of acquiring person determination information of a person passing through the gate apparatus; and a function of setting a light emission state of the second light emission unit to the third state with acquisition of the person determination information and acquisition of the product determination information as at least one condition.

28. The program according to aforementioned 27, further causing the computer to have a function of setting a light emission state of the second light emission unit to the fourth state when at least either of acquisition of the person determination information and acquisition of the product determination information is not completed within a reference time after the first person detection unit detects a person.

29. The program according to aforementioned 27 or 28, further causing the computer to have a function of setting a light emission state of the second light emission unit to the fourth state when the second person detection unit detects a person before at least either of acquisition of the person determination information and acquisition of the product determination information is completed.

30. The program according to aforementioned 27, further causing the computer to have:

a function of setting a light emission state of the second light emission unit to the fourth state when the first person detection unit detects a person; and a function of setting a light emission state of the second light emission unit to the third state when both acquisition of the person determination information and acquisition of the product determination information are subsequently completed.

31. The program according to any one of aforementioned 27 to 30, further causing the computer to have a function of setting a light emission state of the first light emission unit to the first state with completion of both acquisition of the person determination information and acquisition of the product determination information after the first person detection unit detects a person and a light emission state of the first light emission unit is set to the second state as at least one condition.

32. The program according to any one of aforementioned 27 to 31, wherein an IC tag storing the product determination information is attached to the product, and the program further causes the computer to have a function of acquiring the product determination information stored in the IC tag.

33. The program according to any one of aforementioned 27 to 32, further causing the computer to have a function of acquiring the person determination information by processing an image generated by an image capture unit an image capture range of which includes an area of the passage overlapping the gate apparatus.

34. The program according to any one of aforementioned 27 to 33, further causing the computer to have a function of acquiring the person determination information from a storage medium or a communication terminal held by the person.

35. The program according to any one of aforementioned 27 to 34, further causing the computer to have a function of causing a storage unit to store, for checkout processing, the acquired person determination information and the acquired product determination information in association with each other.

What is claimed is:

1. A gate apparatus provided on a passage through which a person passes, the gate apparatus comprising:

a first light emitter;

a first person sensor;

a second person sensor positioned on an exit side of the first person sensor; and a controller that controls the first light emitter by using a detection result of the first person sensor and a detection result of the second person sensor, wherein the controller changes a light emission state of the first light emitter from a first state to a second state with detection of a person by the first person sensor as at least one condition, and changes a light emission state of the first light emitter from the second state to the first state with detection of a person by the second person sensor as at least one condition;

wherein said gate apparatus further comprise:

a second light emitter being positioned on an exit side of the first light emitter and being able to emit light in a third state and a fourth state, wherein the controller controls a light emission state of the second light emitter, wherein said gate apparatus further comprises:

a product determination reader that acquires product determination information of a product passing through the gate apparatus; and a person determination information acquisition unit comprising an image capture unit and an image processor, that acquires person determination information of a person passing through the gate apparatus, wherein the controller sets a light emission state of the second light emitter to the third state with acquisition of the person determination information by the person determination information acquisition unit and acquisition of the product determination information by the product determination reader as at least one condition.

2. The gate apparatus according to claim 1, wherein the controller sets a light emission state of the second light emitter to the fourth state when at least either of acquisition of the person determination information and acquisition of the product determination information is not completed within a reference time after the first person sensor detects a person.

3. The gate apparatus according to claim 1, wherein the controller sets a light emission state of the second light emitter to the fourth state when the second person sensor detects a person before at least either of acquisition of the person determination information and acquisition of the product determination information is completed.

4. The gate apparatus according to claim 1, wherein the controller sets a light emission state of the second light emitter to the fourth state when the first person sensor detects a person and sets a light emission state of the second light emitter to the third state when both acquisition of the person determination information and acquisition of the product determination information are subsequently completed.

5. The gate apparatus according to claim 1, wherein the controller sets a light emission state of the first light emitter to the first state with completion of both acquisition of the person determination information and acquisition of the product determination information after the first person sensor detects a person and a light emission state of the first light emitter is set to the second state as at least one condition.

6. The gate apparatus according to claim 1, wherein an IC tag storing the product determination information is attached to the product, and the product determination reader acquires the product determination information from the IC tag.

7. The gate apparatus according to claim 1, wherein the person determination information acquisition unit acquires the person determination information by processing an image generated by image capturer an image capture range of which includes an area of the passage overlapping the gate apparatus.

8. The gate apparatus according to claim 1, wherein the person determination information acquisition unit acquires the person determination information from a storage medium or a communication terminal held by the person.

9. The gate apparatus according to claim 1, further comprising a processor causing a memory to store, for checkout processing, the person determination information acquired by the person determination information acquisition unit and the product determination information acquired by the product determination reader in association with each other.

10. The gate apparatus according to claim 1, further comprising an enclosure provided on a side of the passage, wherein the second light emitter is positioned on a top of the enclosure.

11. The gate apparatus according to claim 1, further comprising an enclosure provided on a side of the passage, wherein the first light emitter is positioned at a front on an entrance side of the enclosure.

12. A method for controlling, by a computer, a gate apparatus being provided on a passage through which a person passes and including a first light emitter, a first person sensor, a second person sensor positioned on an exit side of the first person sensor, a second light emitter being positioned on an exit side of the first light emitter, a product determination reader, and a person determination information acquisition unit that comprises an image capture unit and an image processor, the method comprising:

changing a light emission state of the first light emitter from a first state to a second state with detection of a person by the first person sensor as at least one condition;

changing a light emission state of the first light emitter from the second state to the first state with detection of a person by the second person sensor as at least one condition;

changing a light emission state of the second light emitter from a third state to a fourth state;

controlling a light emission state of the second light emitter;

acquiring product determination information of a product passing through the gate apparatus;

acquiring person determination information of a person passing through the gate apparatus; and setting a light emission state of the second light emitter to the third state with acquisition of the person determination information by the person determination information acquisition unit and acquisition of the product determination information by the product determination reader as at least one condition.

13. A non-transitory computer readable storage medium storing a program for causing a computer to execute a method for controlling a gate apparatus being provided on a passage through which a person passes and including a first light emitter, a first person sensor, a second person sensor positioned on an exit side of the first person sensor, a second light emitter being positioned on an exit side of the first light emitter, a product determination reader, and a person determination information acquisition unit that comprises an image capture unit and an image processor, the method comprising:

changing a light emission state of the first light emitter from a first state to a second state with detection of a person by the first person sensor as at least one condition;

changing a light emission state of the first light emitter from the second state to the first state with detection of a person by the second person sensor as at least one condition;

changing a light emission state of the second light emitter from a third state to a fourth state;

controlling a light emission state of the second light emitter;

acquiring product determination information of a product passing through the gate apparatus;

acquiring person determination information of a person passing through the gate apparatus; and setting a light emission state of the second light emitter to the third state with acquisition of the person determination information by the person determination information acquisition unit and acquisition of the product determination information by the product determination reader as at least one condition.

* * * * *